US008401182B2

(12) United States Patent
Kim et al.

(10) Patent No.: US 8,401,182 B2
(45) Date of Patent: Mar. 19, 2013

(54) METHOD OF AND DEVICE FOR UPDATING GROUP KEY

(75) Inventors: Dae Youb Kim, Seoul (KR); Mi Suk Huh, Suwon-si (KR); Tae-Chul Jung, Seongnam-si (KR); Hwan Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1261 days.

(21) Appl. No.: 11/819,230

(22) Filed: Jun. 26, 2007

(65) Prior Publication Data
US 2008/0013739 A1 Jan. 17, 2008

(30) Foreign Application Priority Data

Jun. 29, 2006 (KR) ........................ 10-2006-0059792

(51) Int. Cl.
*G06F 21/00* (2006.01)
(52) U.S. Cl. ............................ 380/44; 380/277; 380/286
(58) Field of Classification Search .............. 380/44–47, 380/277, 286
See application file for complete search history.

(56) References Cited

U.S. PATENT DOCUMENTS

| 6,397,329 | B1 | 5/2002 | Aiello et al. |
| 7,260,716 | B1* | 8/2007 | Srivastava ..................... 713/163 |
| 7,434,046 | B1* | 10/2008 | Srivastava ..................... 713/163 |
| 2003/0161474 | A1 | 8/2003 | Matsuzaki et al. |
| 2004/0234074 | A1 | 11/2004 | Sprunk |
| 2005/0018853 | A1* | 1/2005 | Lain et al. ..................... 380/277 |
| 2005/0271210 | A1* | 12/2005 | Soppera ........................ 380/277 |
| 2006/0062394 | A1 | 3/2006 | Kamijo |

FOREIGN PATENT DOCUMENTS

JP 2005-223773 A 8/2005

OTHER PUBLICATIONS

Cho, T. et al. (Dec. 2003). "A Key Recovery Mechanism for Reliable Group Key Management," *Journal of KIISE: Information Networking*. vol. 30, No. 6. pp. 705-713; 9 pages including English translation of Abstract.
Perrig, A. et al. (2001). "ELK, a New Protocol for Efficient Large-Group Key Distribution." Proceedings of IEEE Symposium on Security and Privacy, 2001. pp. 247-262.
Korean Office Action mailed on May 17, 2012, issued in counterpart Korean Patent Application No. 10-2006-0059792; 4 pages.

* cited by examiner

*Primary Examiner* — Benjamin Lanier
(74) *Attorney, Agent, or Firm* — NSIP Law (57) ABSTRACT

A method and device for updating a group key are disclosed. The group key updating method comprises determining a start node for a key update on a binary tree, updating a node key of the start node for a key update, updating a node key of a parent node of a node corresponding to the updated node key using the updated node key, and repeatedly performing the updating of the node key of the parent node, and then updating a node key corresponding to a root node of the binary tree. With the disclosed method and device, it is possible to efficiently perform a group key update process.

11 Claims, 12 Drawing Sheets

METHOD OF AND DEVICE FOR UPDATING GROUP KEY

CROSS-REFERENCE TO RELATED APPLICATION

This application claims the benefit under 35 U.S.C. §119(a) of Korean Patent Application No. 10-2006-0059792, filed on Jun. 29, 2006 in the Korean Intellectual Property Office, the entire disclosure of which is hereby incorporated by reference.

BACKGROUND OF THE INVENTION

1. Field of the Invention

The present invention relates to a group key-updating method and device, in which keys of members within a group are updated. More particularly, the present invention relates to a method and device for updating a group key in which when a new member joins a group or an existing member leaves the group, the keys of members in the group can be effectively updated.

2. Description of the Related Art

Traditionally, contents provided to members in a group are encrypted in a server so as not to allow users, except the group members, to utilize the contents. Thus, all the members in the group have an encryption key for decrypting the encrypted contents provided by the server.

Updating of the encryption key of the group members is a very crucial issue. For instance, in the case a new member is joining a group, it is required that the new member have access to only contents after a point in time when the new member join the group. Therefore, when a new member joins the group, a key of existing group members is updated and the new member can share the updated new key with the existing group members.

In addition, in the case an existing member is leaving the group, it is required that the leaving member be refused further access to contents. Thus, a method is needed to update a key used by the group members prior to a point in time when the leaving member has left the group.

When updating a group key is desired, the update can be performed in the following two exemplary implementations.

In the first exemplary implementation, a server calculates the updated key to transmit it to an associated member. The server must calculate a key for all the members requiring the updating of the group key and transmit the calculated key, which can result in an increase in the server's load.

In the second exemplary implementation, a member requiring the updating of the group key calculates the key by themselves and performs a necessary key-updating process. A server then calculates the updated key for only a member who cannot perform a self-update process and transmits the calculated key to the associated member, which results in a relative decrease in the server's load. However, it is difficult for a member requiring the updating of the key to efficiently perform the self-update process.

Accordingly, there is a need for an improved method and device for updating a group key, which can efficiently perform a self-update process.

SUMMARY OF THE INVENTION

Exemplary embodiments of the present invention address at least the above problems and/or disadvantages and provide at least the advantages described below. Accordingly, an aspect of exemplary embodiments of the present invention is to provide an improved method and device for updating a group key which can efficiently perform a self-update process.

Exemplary embodiments of the present invention provide an efficient method and device for transmitting the necessary keys to members who cannot perform a self-update process. Specifically, an object of exemplary embodiments of the present invention is to effectively select nodes requiring a self-update process and efficiently perform the updating of a key for the selected nodes.

Accordingly, an aspect of exemplary embodiments of the present invention is to provide a method of updating a group key, including determining a start node for a key update on a binary tree, updating a node key of the start node for a key update, updating a node key of a parent node of a node corresponding to the updated node key using the updated node key, and updating a node key corresponding to a root not of the binary tree by repeatedly performing the updating of the node key of the parent node.

In an exemplary embodiment, the group key updating method further includes encrypting a node key of the parent node in an identical method as the descendent node and transmitting the encrypted node key of the parent node to the group member when the parent node has a group member corresponding to a descendent node besides the node corresponding to the updated node key.

In an exemplary embodiment, encrypting a node key of the parent node includes encrypting the node key of the parent node with a node key of the descendent node.

In an exemplary embodiment, updating a node key of the parent node includes setting an output of a one-way function for the updated node key as the node key of the parent node.

In an exemplary embodiment, the start node for a key update includes determining a node corresponding to the new member as the start node for a key update when a new member joins the group, and when an existing member leaves the group, determining a start node for a key update where a lowermost ancestor node having a descendent node corresponds to a group member, except the leaving member, among ancestor nodes of a node corresponding to the leaving member.

In an exemplary embodiment, updating a node key of the start node for a key update includes setting a member key of the new member as the node key of the start node for a key update when a new member joins the group, and when the existing member leaves the group, updating the node key of the start node for a key update using a node key of a descendent node, except the node corresponding to the leaving member, of the ancestor node having the descendent node. In this case, when the existing member leaves the group, a node key of a descendent node, except the node corresponding to the existing member, of the ancestor node having the descendent node may be set as the node key of the start node for a key update, and an output of a one-way function for a node key of a descendent node except the node corresponding to the leaving member of the ancestor node having the descendent node may be set as the node key of the start node for a key update.

According to another aspect of exemplary embodiments, there is provided a device for updating a group key including a start node-determining section for determining a start node for a key update on a binary tree, a start node-updating section for updating a node key of the start node for a key update, a tree-updating section for updating a node key of a parent node of a node corresponding to the updated node key using the updated node key, and a key update controller for controlling the tree-updating section to sequentially perform a key update process for the binary tree so as to update a node key corresponding to a root node of the binary tree.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary features and advantages of certain exemplary embodiments of the present invention will become more apparent from the following detailed description of certain exemplary embodiments thereof when taken in conjunction with the accompanying drawings, in which.

Throughout the drawings, like reference numerals will be understood to refer to like elements, features and structures.

DETAILED DESCRIPTION OF EXEMPLARY EMBODIMENTS

The matters exemplified in this description are provided to assist in a comprehensive understanding of various exemplary embodiments of the present invention discloses with reference to the accompanying figures. Accordingly, those of ordinary skill in the art will recognize that various changes and modifications of the exemplary embodiments described herein can be made without departing from the scope and spirit of the claimed invention. Also, descriptions of well-known functions and constructions are omitted for clarity and conciseness.

Figure 1:
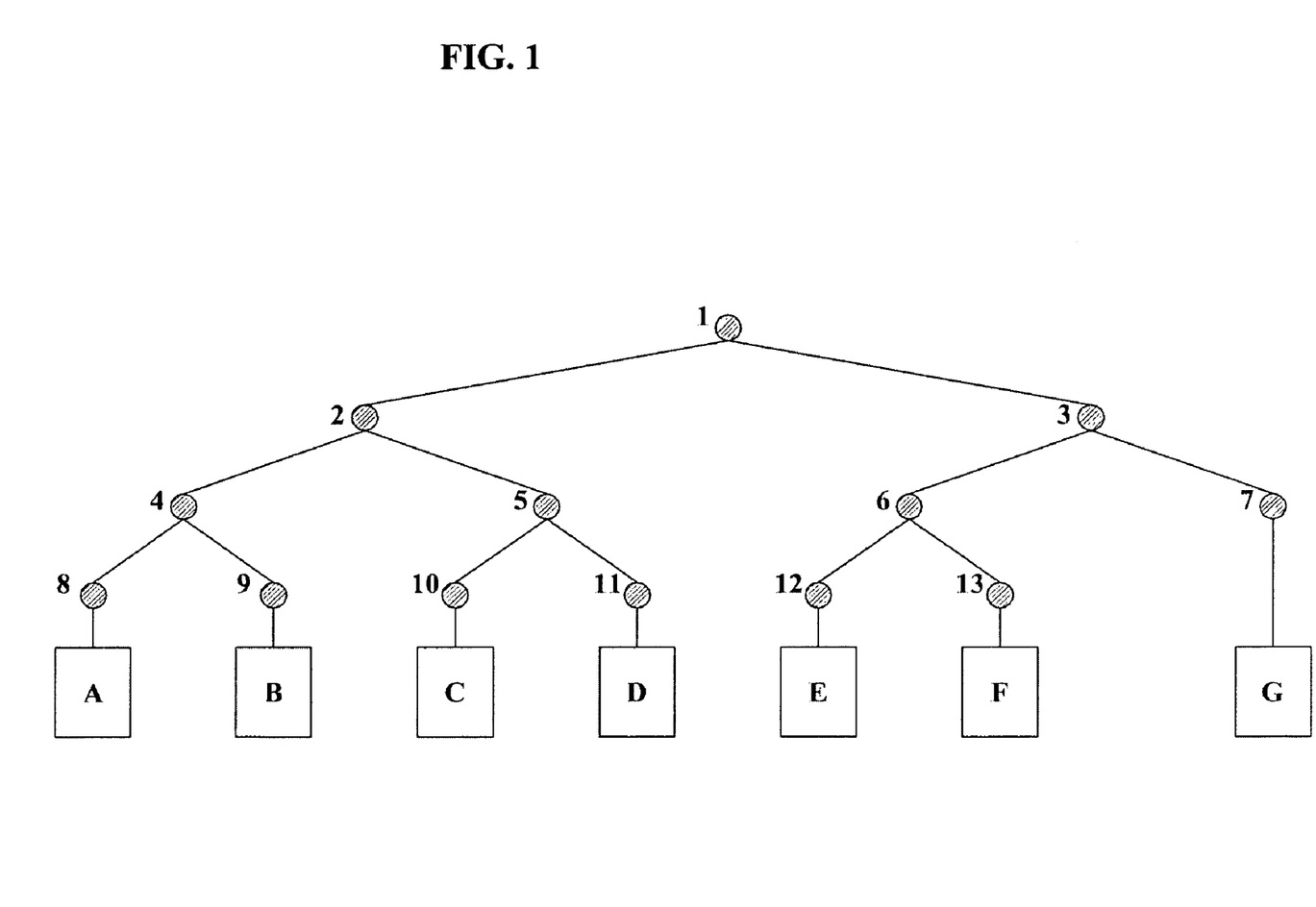
FIG. 1 is a schematic diagrammatic view illustrating a binary tree structure corresponding to one example of a group according to an exemplary embodiment of the present invention.

FIG. 1 is a schematic diagrammatic view illustrating a binary tree structure corresponding to one example of a group according to an exemplary embodiment of the present invention. Referring to FIG. 1, each group member A, B, C, D, E, F and G corresponds to a leaf node of a binary tree, where members A, B, C, D, E, F and G may correspond to a device or a user. Each leaf node of the binary tree has an inherent encryption key. A root node encrypted key can be transmitted by the server to the other nodes. For example, in FIG. 1, in the binary tree structure, a key corresponding to nodes other than the root node is used for the purpose of updating the key. In one exemplary embodiment of the present invention, the key corresponding to the nodes, other than the root node, is used to update a key of a parent node of a corresponding node.

In another aspect of an exemplary embodiment, a key of a leaf node can be set as a member key of a corresponding member where each group member stores node keys of all the nodes on a path running from a corresponding leaf node to the root node. For example, a member, A, stores node keys of nodes 8, 4, 2 and 1, respectively, and member F stores node keys of nodes 13, 6, 3 and 1, respectively.

Figure 2:
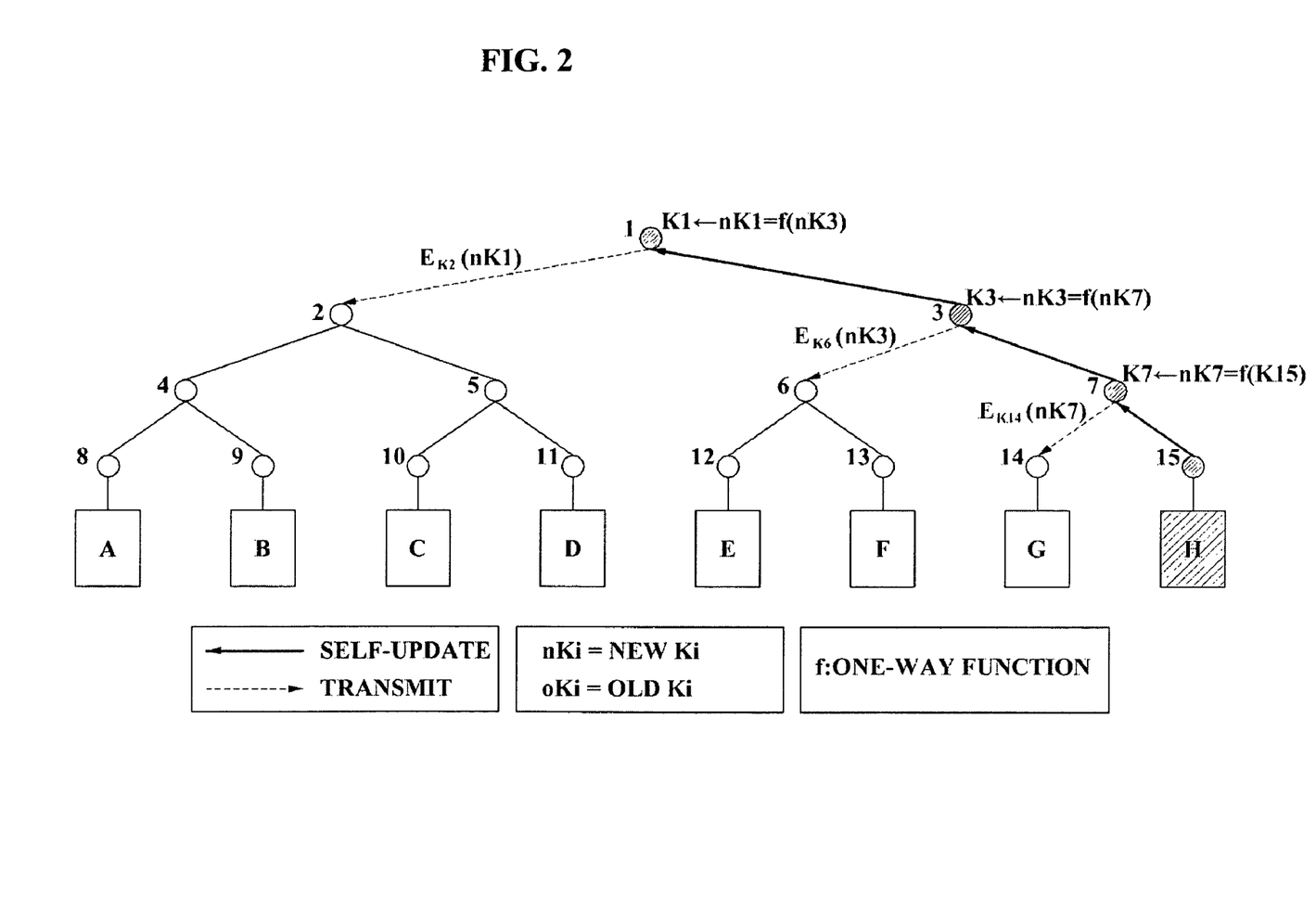
FIG. 2 is a schematic diagrammatic view illustrating a binary tree structure corresponding to the case where a new member joins the group shown in FIG. 1.

FIG. 2 is a schematic diagrammatic view illustrating a binary tree structure corresponding to the case where a new member joins the group shown in FIG. 1. In FIG. 2, a path denoted by a solid line represents a self-update path and a path denoted by a dotted line represents an update path transmitted by a server. For example, in FIG. 2, when new member H joins the group, node 7 is split to generate node 14 and node 15. In this case, a node corresponding to member G is changed from node 7 to node 14 and node 15 corresponds to the new member H.

In the case of the node split when a new member joins, it can be determined to be a node having a minimum or maximum node ID in a complete binary tree and can be determined to be a node having a minimum or maximum node ID among selected nodes with a leaf node whose depth is smallest in a incomplete binary tree. For example, in FIG. 2, when new member H joins the group, a node 15 corresponding to new member H is determined to be a start node for a key update. A node key of the start node for a key update is set as a member key of member H. The member key may be shared by the server and member H before the start of the key update. When the node key of node 15 is determined, the node key of node 7 is updated using the node key of node 15. Also, the node key of node 7 can be set as an output of a one-way function for the node key of node 15. For example, when the node key of the node 15 is K15, an update value, nK7, of node key K7 of node 7 can be set to f(K15). In this case, f( ) is a one-way function. Additionally, in order to prevent the same key from being generated every time the node key is updated, an input value of the function f includes a node key value as well as update information (e.g. updated date, the frequency of updates and so on). For clarity, f(K) is equivalent to f(K, update information), herein. And so, when the node key of node 7 is updated, a node key of a node 3 is also updated using the updated node key of node 7. In this case, the node key of node 3 can be set as an output of a one-way function for the node key of node 7. For example, when the node key of node 7 is K7, an update value, nK3, of node key K3 of node 3 can be set to f(K7). Also, when the node key of node 3 is updated, the node key of node 1 is also updated using the updated node key of node 3. In this case, the node key of node 1 can be set as an output of a one-way function for the node key of node 3. When the node key of the node 3 is K3, an update value, nK1, of the node key K1 of node 1 can be set to f(K3). It can be seen from an example of the binary tree structure shown in FIG. 2 that a self-update process is performed repeatedly along a path running from node 15 via nodes 7 and 3 to node 1.

Also, as seen in FIG. 2, since member G, that corresponds to node 14, does not know the updated node key of node 7, a server encrypts the updated node key of node 7 and transmits the encrypted node key of node 7 to the member G and the updated node key of node 7 is encrypted with a node key of node 14. Member G receives the encrypted key of node 7 from the server and can sequentially calculate the received node key of node 3 and the node key of node 1 using the one-way function for the node key of node 7.

Accordingly, as seen in FIG. 2, since members E and F, that correspond to descendent nodes of a node 6, do not know the updated node key of node 3, the server can encrypt the updated node key of node 3 and transmit the encrypted node key of node 3 to the members E and F and the updated node key of node 3 is encrypted with a node key of node 6. The members E and F receive the encrypted key of node 3 from the server and can sequentially calculate the node key of node 1 using the one-way function for the node key of node 3.

Further, since members A, B, C and D corresponding to descendent nodes of node 2 do not know the updated node key of the node 1, the server can encrypt the updated node key of node 1 and transmit the encrypted node key of the node 1 to the members A, B, C and D and the updated node key of node 1 is encrypted with a node key of node 2. The members A, B, C and D corresponding to descendent nodes of the node 2 cannot identify the node keys of the nodes 3, 6, 7, 12, 13, 14 and 15 using the encrypted node key of the node 1 in terms of the characteristic of the one-way function.

Figure 3:
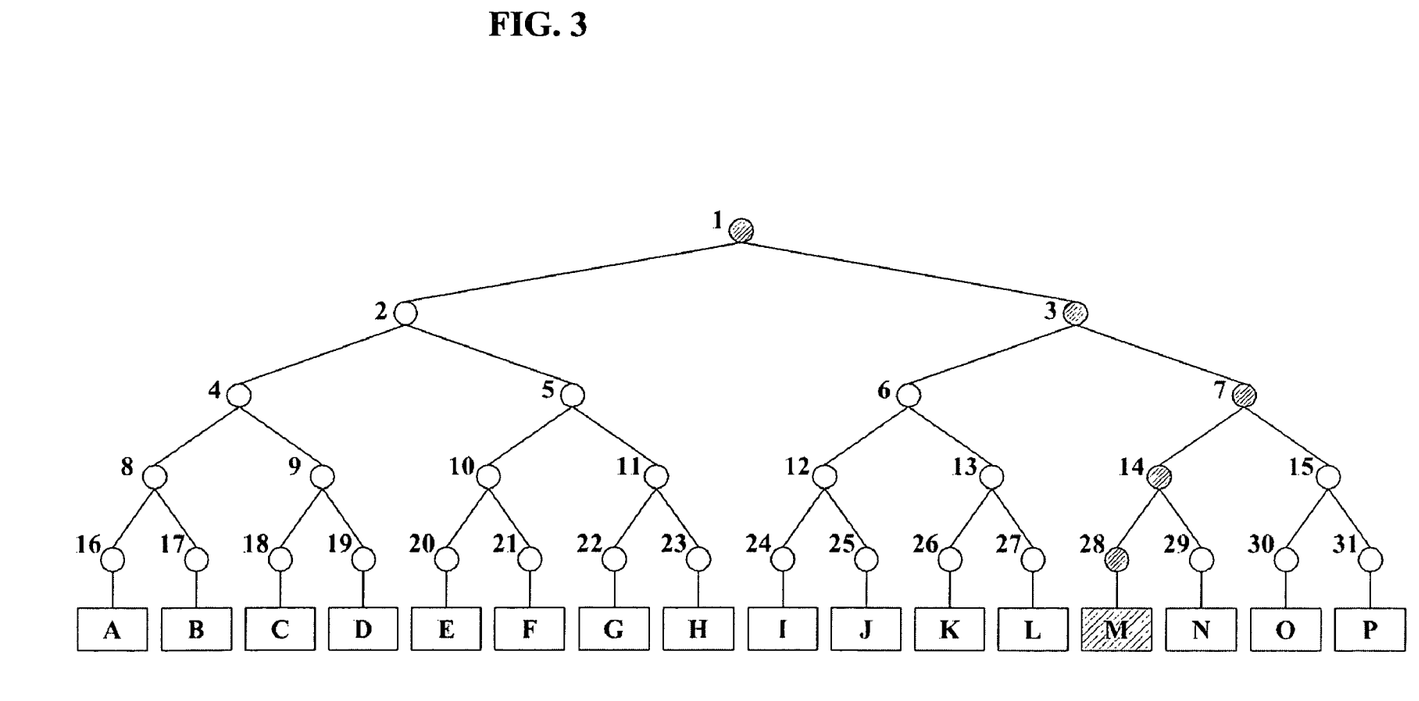
FIG. 3 is a schematic diagrammatic view illustrating a binary tree structure corresponding to another example of a group according to an exemplary embodiment of the present invention.

FIG. 3 is a schematic diagrammatic view illustrating a binary tree structure corresponding to another example of a group according to an exemplary embodiment of the present invention where member M leaves the group which causes a self-update path running from node 14 via nodes 7 and 3 to node 1 to be set. Specifically, node 14 is set as a start node for a key update and a node key update process is performed while following parent nodes along a path running from node 14 to the root node 1.

Figure 4:
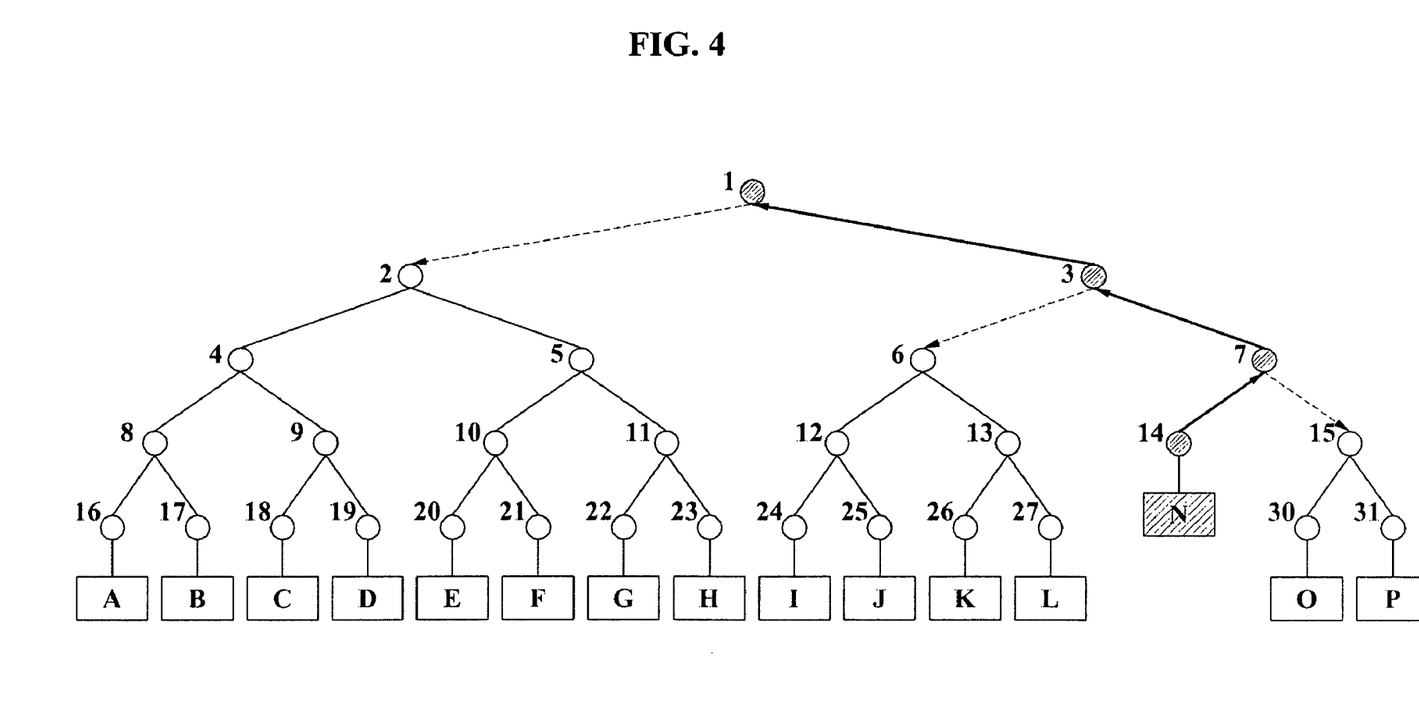
FIG. 4 is a schematic diagrammatic view illustrating a binary tree structure corresponding to the case where an existing member leaves the group shown in FIG. 3.

FIG. 4 is a schematic diagrammatic view illustrating a binary tree structure corresponding to the case where an existing member leaves the group shown in FIG. 3. Specifically, FIG. 4 shows where an existing member M (as shown in FIG. 3) leaves the group, nodes 28 and 29 are cancelled and a node 14 becomes the node corresponding to a member N. In this case, node 14 is a start node for a key update and is set as a member key of member N. The key update process performed on a self-update path running from node 14 via nodes 7 and 3 to root node 1 is applied similarly to the self-update process described above with reference to FIGS. 1 and 2. That is, the node key of node 7 is updated using the node key of node 14. Also, the node key of node 7 can be set as an output of a one-way function for the node key of node 14. For example, when the node key of the node 14 is K14, an update value nK7 of node key K7 of node 7 can be set as f(K14), where f( ) is a one-way function.

Additionally, when the node key of node 7 is updated, a node key of node 3 is updated using the updated node key of node 7. The node key of node 3 can be set as an output of a one-way function for the node key of node 7. For example, when a node key of the node 7 is K7, an update value nK3 of node key K3 of node 3 can be set as f(K7).

Also, when the node key of node 3 is updated, a node key of node 1 is updated using the updated node key of the node 3. The node key of node 1 can be set as an output of a one-way function for the node key of node 3. For example, when the node key of node 3 is K3, an update value nK1 of the node key K1 of node 1 can be set as f(K3). Since members O and P corresponding to node 15 do not know the updated node key of the node 7, a server can encrypt the updated node key of the node 7 and transmit the encrypted node key of node 7 to the members O and P. The updated node key of node 7 is encrypted with a node key of the node 15. The members O and P receives the encrypted key of the node 7 from the server and can sequentially calculate the received node key of node 3 and the node key of node 1 using the one-way function for the node key of node 7.

Additionally, since members I, J, K, and L, that correspond to descendent nodes of node 6, do not know the updated node key of node 3, the server can encrypt the updated node key of node 3 and transmit the encrypted node key of node 3 to members I, J, K, and L. Accordingly, the updated node key of node 3 is encrypted with a node key of the node 6. Members I, J, K, and L receive the encrypted key of the node 3 from the server and can calculate the node key of the node 1 using the one-way function for the node key of the node 3.

Further, since members A to H, that correspond to descendent nodes of node 2, do not know the updated node key of node 1, the server can encrypt the updated node key of node 1 and transmit the encrypted node key of node 1 to members A to H. In this case, the updated node key of node 1 is encrypted with a node key of node 2.

Thus, when the number of group members is N, a data transfer size is no more than $\log_2 N - 1$ and a data storage size is no more than $\log_2 N$ through the use of a group key-updating method according to exemplary embodiments of the present invention.

Figure 5:
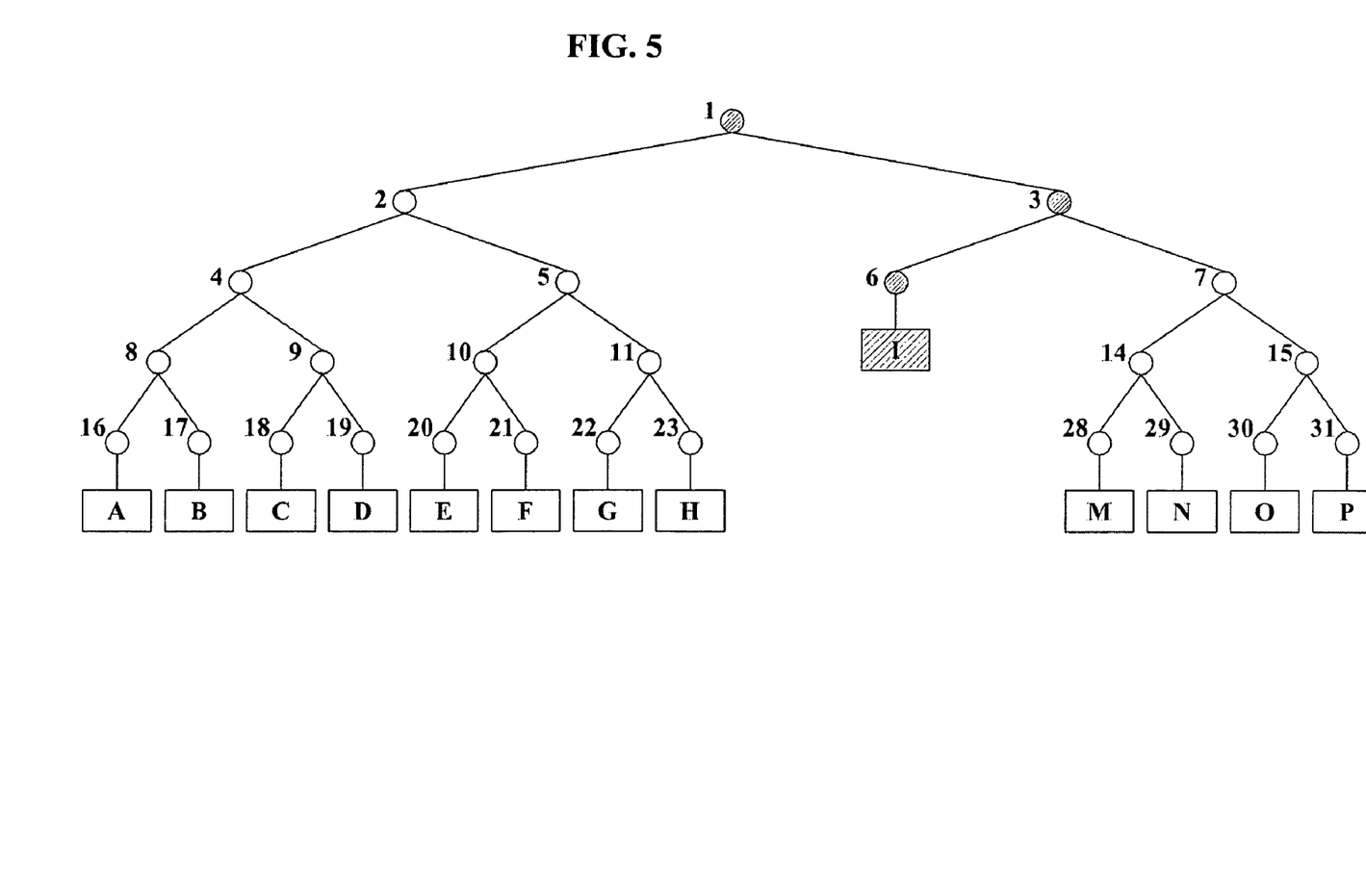
FIG. 5 is a schematic diagrammatic view illustrating a binary tree structure corresponding to another example of a group according to an exemplary embodiment of the present invention.

FIG. 5 is a schematic diagrammatic view illustrating a binary tree structure corresponding to another example of a group according to an exemplary embodiment of the present invention where an existing member, I, leaves the group which causes a self-update path running from a node 3 to a node 1 to be set. Specifically, node 3 is set as a start node for a key update and a node key update process is performed while following parent nodes along a path running from node 3 to a root node.

Figure 6:
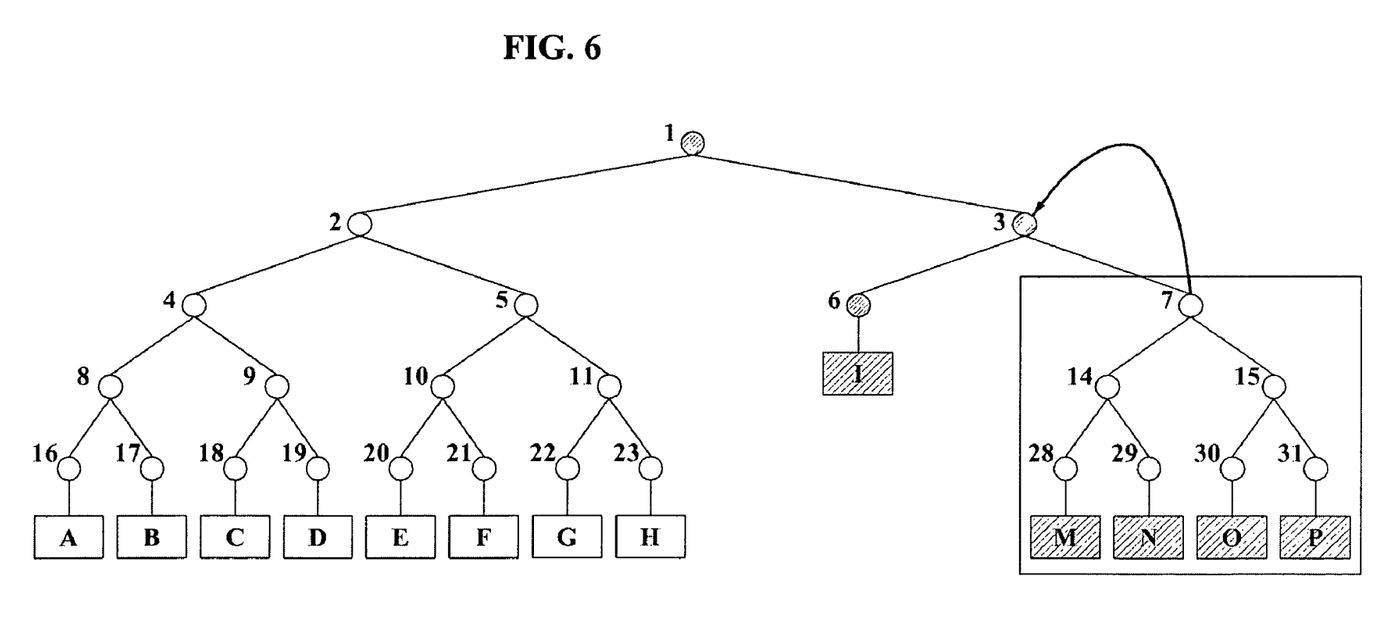
FIG. 6 is a schematic diagrammatic view illustrating a binary tree structure corresponding to the case where an existing member leaves the group shown in FIG. 5.

FIG. 6 is a schematic diagrammatic view illustrating modification of a binary tree structure corresponding to the case where an existing member leaves the group shown in FIG. 5. Specifically, FIG. 6 shows where an existing member I (as shown in FIG. 5) leaves the group and node 3 (which is a parent node of a node 6 corresponding to the member I) is replaced with node 7. That is, descendent node 7 replaces it's parent node 3, where, prior to the replacement, node 3 was the parent of node 6 corresponding to the leaving member I.

Figure 7:
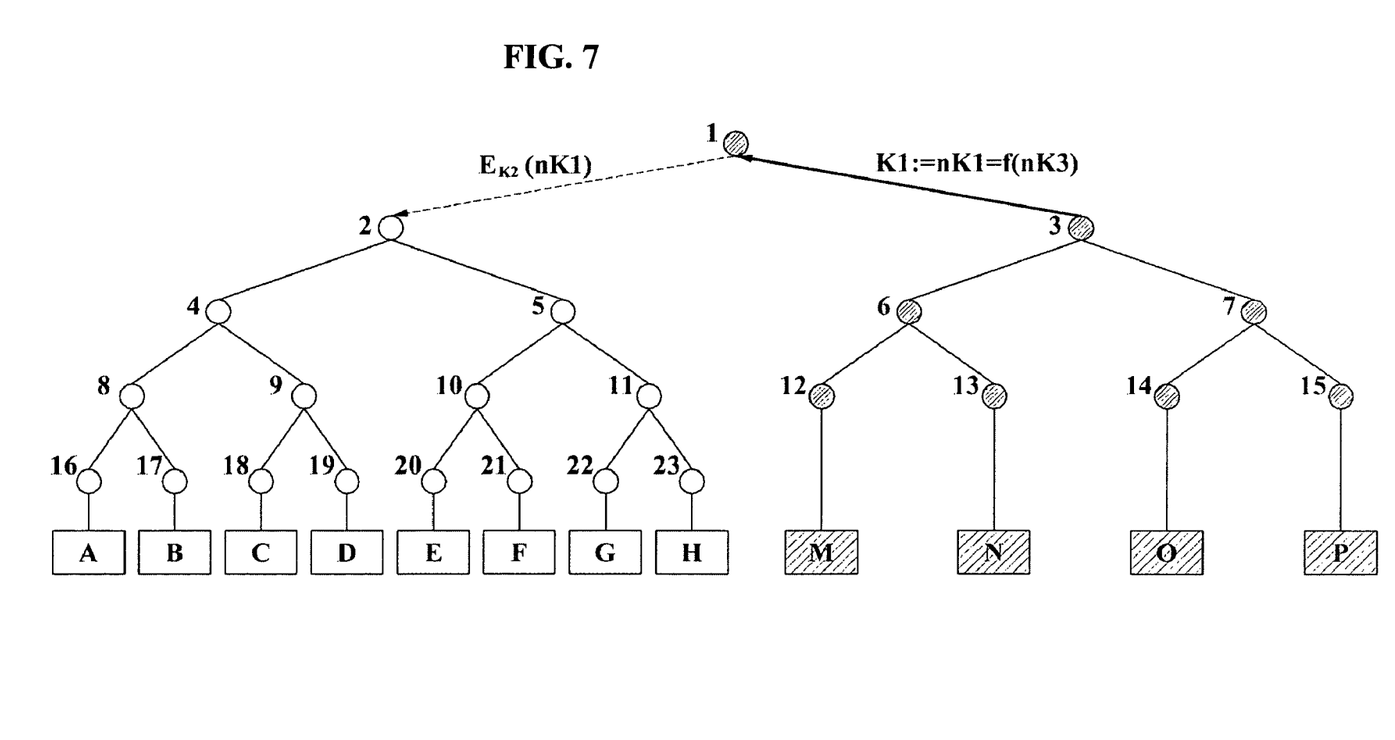
FIG. 7 is a schematic diagrammatic view illustrating a binary tree structure corresponding to a result of the case where an existing member leaves the group shown in FIG. 5.

FIG. 7 is a schematic diagrammatic view illustrating a binary tree structure corresponding to a result of the case where an existing member leaves the group shown in FIG. 5. For example, referring to FIGS. 5, 6 and 7, when nodes 3 and 6 and corresponding member I are removed from the binary tree shown in FIGS. 5 and 6, then node 7 is changed to node 3, node 14 is changed into node 6, node 15 is changed into node 7, node 28 is changed into node 12, node 29 is changed into node 13, node 30 is changed into node 14 and node 31 is changed into node 15, respectively, as shown in FIG. 7.

In this case, the node key of the node 3 is replaced with the node key of node 7 prior to modification of the node, node key of node 6 is replaced with the node key of node 14 prior to modification of the node, node key of node 7 is replaced with the node key of node 15 prior to modification of the node, node key of node 12 is replaced with the node key of the node 28 prior to modification of the node, node key of node 13 is replaced with the node key of node 2 prior to modification of the node, node key of node 14 is replaced with the node key of node 30 prior to modification of the node and node key of the node 15 is replaced with the node key of node 31 prior to modification of the node.

When the node key of node 3 (a start node) for a key update is replaced with the node key of the node 7, node key of node 1 is updated using a node key, nK3, of the updated node 3. That is, an output of a one-way function for the node key of the updated node 3 is updated into a node key of node 1.

In this case, the members A to H corresponding to descendent nodes of node 2 receive the node key of the updated node 1 from the server. In this case, the node key of the updated node 1 is encrypted with a node key of node 2 for transmission to node 2.

Referring to FIG. 7, as described above, in a binary tree structure corresponding to a group, the size of the binary tree may vary depending on the number of members, but the depth may be fixed irrespective of the number of members. That is, the binary tree corresponding to the group is a complete binary tree whose depth is fixed and leaf nodes of the complete binary tree can be divided into a subscribed node having corresponding members and unsubscribed nodes not having corresponding members.

In this case, if it is assumed that the entire number of the members is N, the server constitutes a binary tree having a depth of $\log_2 N$ and each member must initially store a $\log_2 N$ number of node keys.

Figure 8:
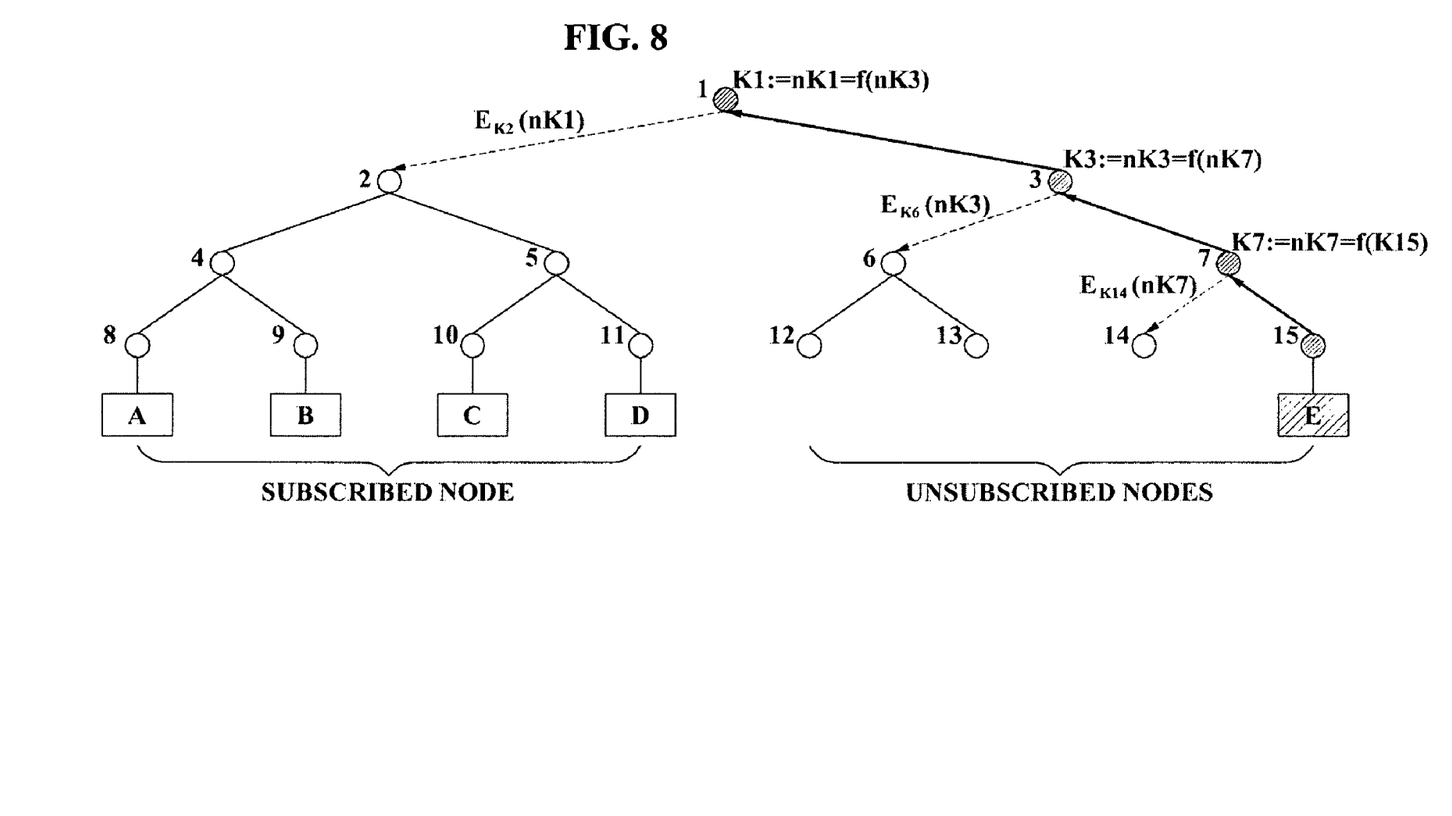
FIG. 8 is a schematic diagrammatic view illustrating a group corresponding to one example of a fixed binary tree structure.

FIG. 8 is a schematic diagrammatic view illustrating a group corresponding to one example of such a fixed binary tree structure. For example, as shown in FIG. 8, nodes 8, 9, 10, and 11 are subscribed nodes corresponding to members A, B, C and D, respectively. Nodes 12, 13, 14 and 15 are unsubscribed nodes. In this case, a new member E joins the group in the state of the unsubscribed node and is assigned to a node 15. Upon new member E joining the group, node 15 is no longer unsubscribed. Node 15 is set as a start node for a key update and the node key of node 15 is set as a member key of the member E. When the node key of node 15 is determined, a node key of node 7 is updated using the node key of node 15. In this case, the node key of node 7 can be set as an output of a one-way function for the node key of node 15. For example, when the node key of node 15 is K15, an update value nK7 of node key K7 of node 7 can be set as f(K15).

Additionally, when the node key of node 7 is updated, a node key of node 3 is updated using the updated node key of node 7. In this case, the node key of node 3 can be set as an output of a one-way function for the node key of node 7. For example, when the node key of node 7 is K7, an update value, nK3, of node key K3 of node 3 can be set to f(nK7).

Also, when the node key of node 3 is updated, a node key of node 1 is updated using the updated node key of node 3. In this case, the node key of node 1 can be set as an output of a one-way function for the node key of node 3. For example, when the node key of node 3 is K3, an update value, nK1, of the node key K1 of the node 1 can be set to f(nK3).

Thus, it can be seen from an example of a binary tree structure shown in FIG. 8 that a self-update process is performed along a path running from node 15 via the nodes 7 and 3 to root node 1.

Additionally, since a member corresponding to node 14 does not exist, the server may not encrypt the updated node key of the node 7 for transmission to the member. Since members A, B, C and D, that correspond to descendent nodes of a node 2, do not know the updated node key of node 1, the server can encrypt the updated node key of node 1 and transmit the encrypted node key of node 1 to members A, B, C and D. In this case, the updated node key of node 1 is encrypted with a node key of node 2.

Figure 9:
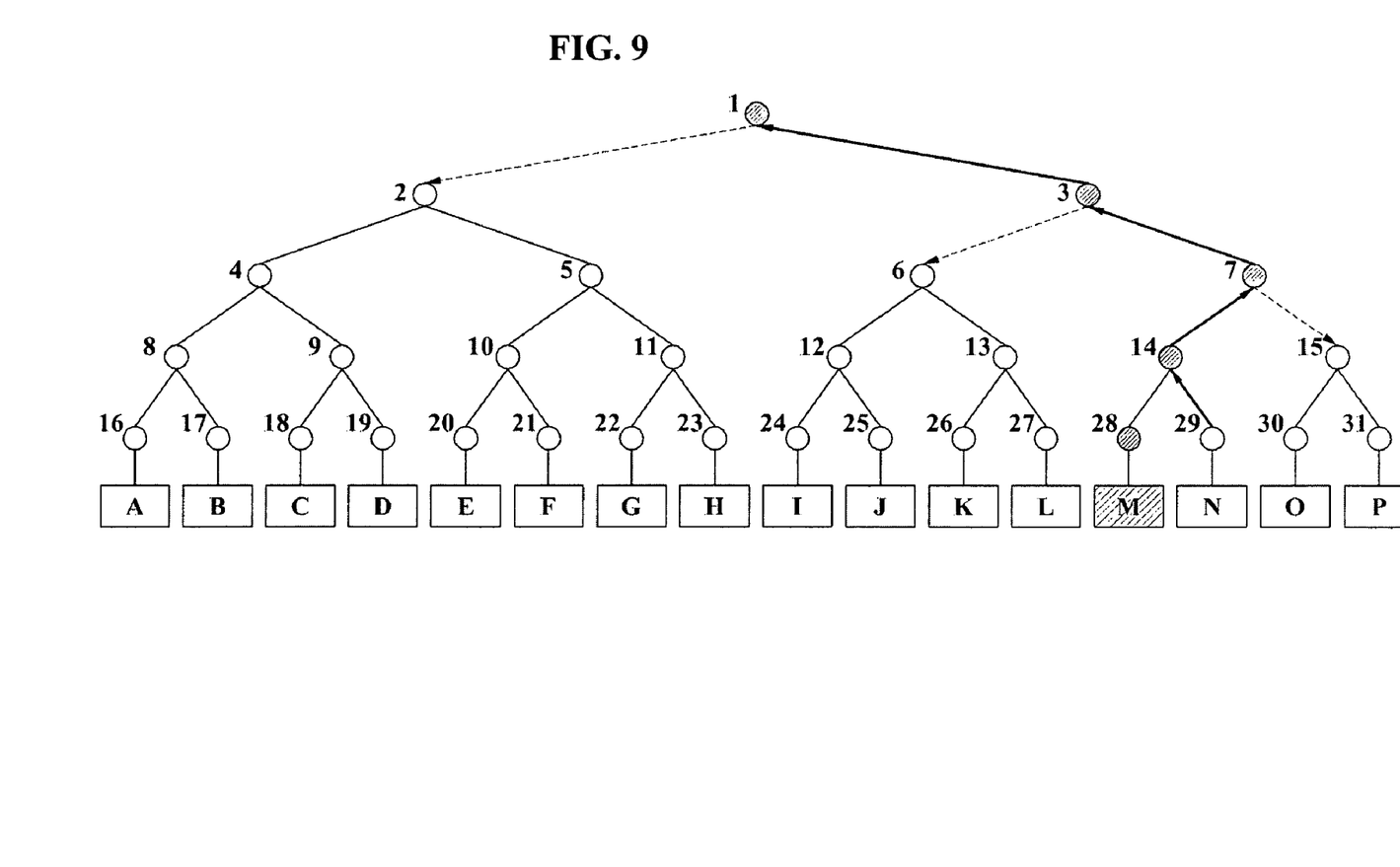
FIG. 9 is a schematic diagrammatic view illustrating a group corresponding to another example of a fixed binary tree structure.

FIG. 9 is a schematic diagrammatic view illustrating a group corresponding to another example of a fixed binary tree structure. Referring to FIG. 9, when an existing member M leaves the group, node 14 is set as a start node for a key update and a self-update path, running from node 14 via nodes 7 and 3 to a root node 1, is formed. Node 29 remains as a node corresponding to a member N, as is. When member M leaves the group, a node 28 becomes an unsubscribed node and node 14 as the start node for a key update is updated using a node key of node 29. A node key of node 14 can be set as an output of a one-way function for the node key of node 29. A node key of node 7 can be set as an output of a one-way function for the updated node key of node 14, a node key of node 3 can be set as an output of a one-way function for the updated node key of node 7, and a node key of root node 1 can be set as an output of a one-way function for the updated node key of the node 3. An unsubscribed node is a node that does not have a corresponding member. A subscribed node is a node that has a corresponding member.

Until this point, since members O and P, both corresponding to node 15 do not know the updated node key of node 7, a server can encrypt the updated node key of node 7 and transmit the encrypted node key of node 7 to members O and P. In this case, the updated node key of node 7 is encrypted with a node key of node 15. Members O and P receives the encrypted key of node 7 from the server and can sequentially calculate the node key of node 3 and the node key of node 1 using the received node key of node 7. Also, since members I, J, K, and L, that correspond to descendent nodes of node 6, do not know the updated node key of node 3, the server can encrypt the updated node key of node 3 and transmit the encrypted node key of node 3 to members I, J, K, and L. The updated node key of node 3 is encrypted with a node key of node 6. Members I, J, K, and L receive the encrypted key of the node 3 from the server and can calculate the node key of node 1 using the received node key of node 3. Additionally, since members A through H, that correspond to descendent nodes of node 2, do not know the updated node key of node 1, the server can encrypt the updated node key of node 1 and transmit the encrypted node key of node 1 to members A through H. In this case, the updated node key of node 1 is encrypted with a node key of node 2.

Figure 10:
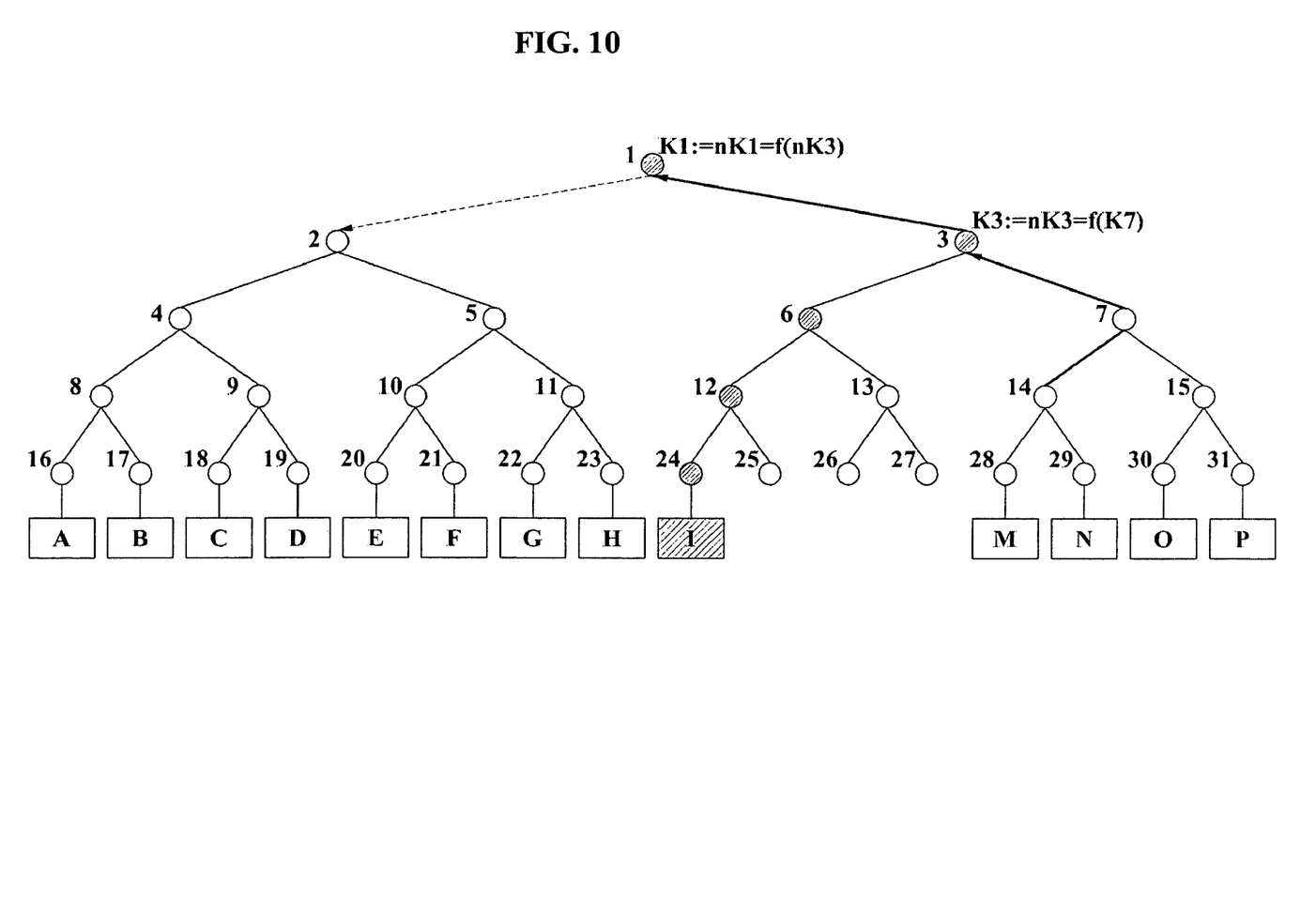
FIG. 10 is a schematic diagrammatic view illustrating another group corresponding to another example of a fixed binary tree structure.

FIG. 10 is a schematic diagrammatic view illustrating another group corresponding to another example of a fixed binary tree structure. Referring to FIG. 10, when member I leaves the group, node 3 is set as the start node for a key update and an update path running from node 3 to node 1 is formed. Node 3 is set as the start node for a key update since it is a node having descendent nodes corresponding to members in the group among ancestor nodes of node 24 corresponding to the member I. When member I leaves the group, node 24 becomes an unsubscribed node, node 3 is set as the start node for a key update and node 3 is updated using a node key of node 7. The node key of node 3 can be set as an output of a one-way function for the node key of node 7. The node key of a node 1 can be set as an output of a one-way function for the updated node key of node 3.

Further, since members A through H, that correspond to descendent nodes of node 2, do not know the updated node key of node 1, the server can encrypt the updated node key of node 1 and transmit the encrypted node key of node 1 to members A to H. The updated node key of node 1 is encrypted with a node key of node 2. The node keys of the nodes on a path running from node 24 to node 6 are managed while being updated by the server. Thereafter, when a corresponding node becomes a subscribed node, the server can transmit the node key of the subscribed node to a new member corresponding to the subscribed node.

Figure 11:
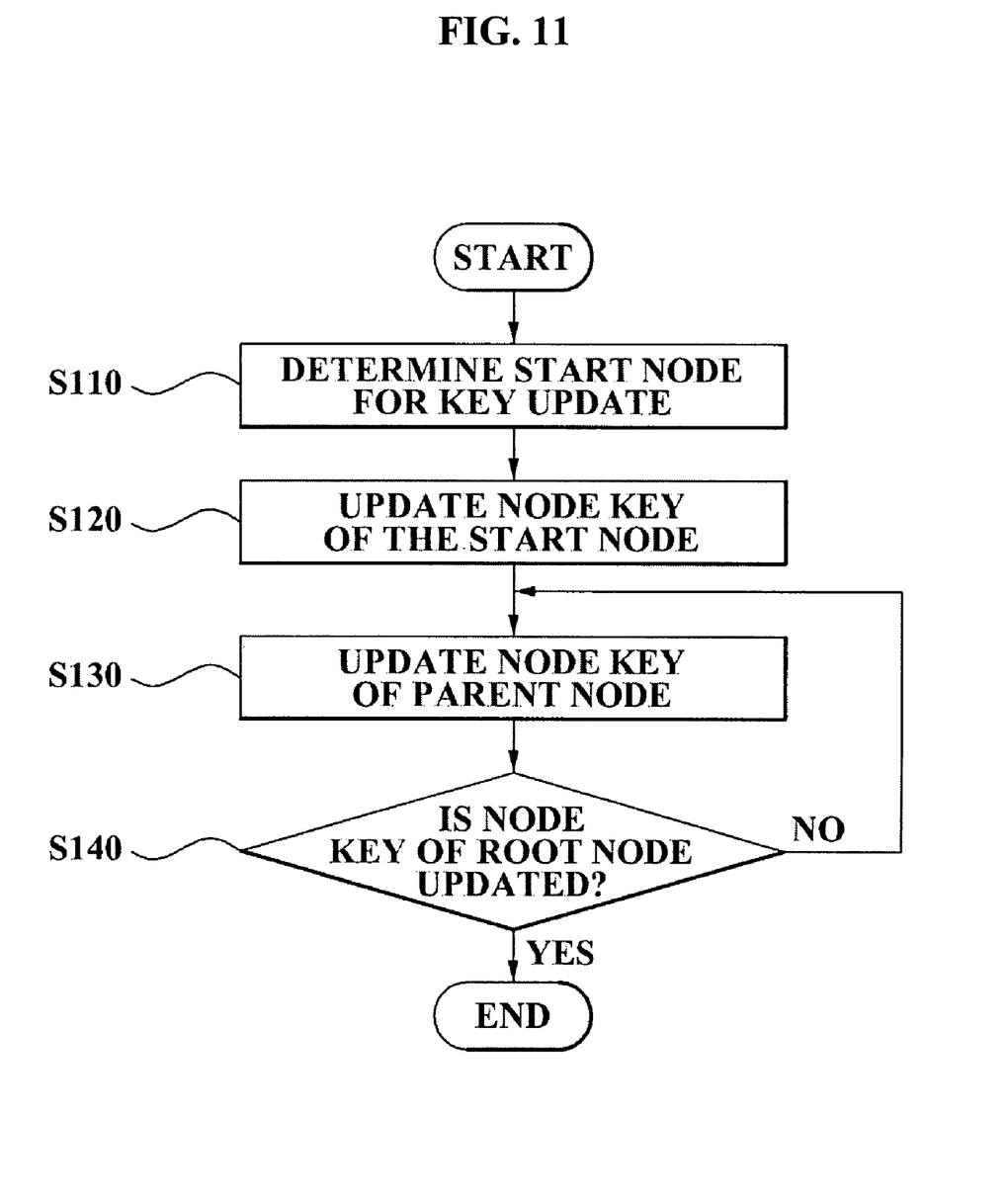
FIG. 11 is a flowchart illustrating the process of updating a group key according to an exemplary embodiment of the present invention.

FIG. 11 is a flowchart illustrating the process of updating a group key according to an exemplary embodiment of the present invention. Referring to FIG. 11, at step S110, a start node for a key update is determined on a binary tree. Specifically, in step S110, when a new member joins the group, a node corresponding to the new member can be determined as the start node for a key update. Also, in step S110, when an existing member leaves the group, it is possible to determine, as the start node for a key update, a lowermost ancestor node having a descendent node corresponding to a group member except the existing member among ancestor nodes of a node corresponding to the existing member.

In the case of a new member, the node corresponding to the new member can be one of nodes generated by splitting any one of a leaf node whose node ID is minimum and a leaf node whose node ID is maximum among leaf nodes of the binary tree if the binary tree is a complete binary tree. Additionally, the node corresponding to the new member can be one of the nodes generated by splitting any one of a leaf node whose node ID is minimum and a leaf node whose depth is maximum among leaf nodes whose depth is the smallest if the binary tree is an incomplete binary tree.

In the group key-updating method according to one exemplary embodiment of the present invention, at subsequent step S120, a node key of the start node for a key update is updated. In step S120, when a new member joins the group, a member key of the new member can be set as the node key of the start node for a key update and when an existing member leaves the group, it is possible to set, as the node key of the start node for a key update, a node key of a descendent node except the node corresponding to the existing member of the ancestor node having the descendent node. When the new member joins the group, a member key of the new member is set as the node key of the start node for a key update and when the existing member leaves the group, the node key of the start node for a key update can be updated using a node key of a descendent node except the node corresponding to the existing member of the ancestor node having the descendent node. In this case, if the existing member leaves the group, it is possible to set, as the node key of the start node for a key update, an output of a one-way function for a node key of a descendent node except the node corresponding to the existing member of the ancestor node having the descendent node.

In step S130, a node key of a parent node of a node corresponding to the updated node key is updated using the updated node key and an output of a one-way function for the updated node key can be set as the node key of the parent node. In step S140, the updating of the node key of the parent node is repeatedly performed until a node key corresponding to the root node is updated.

Although not shown in FIG. 11, the group key-updating method may further comprise a step of, when the parent node has a group member corresponding to a descendent node besides the node corresponding to the updated node key, encrypting a node key of the parent node in an identical method as the descendent node and transmitting the encrypted node key of the parent node to the group member. In this case, the step of encrypting the node key of the parent node may comprise encrypting the node key of the parent node with a node key of the descendent node.

Additionally, the group key-updating method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape, optical media such as CD ROM disks and DVD, magneto-optical media such as optical disks, and hardware devices that are specially configured to store and perform program instructions, such as read-only memory (ROM), random access memory (RAM), flash memory, and the like. The media may also be a transmission medium such as optical or metallic lines, wave guides, and the like. including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 12:
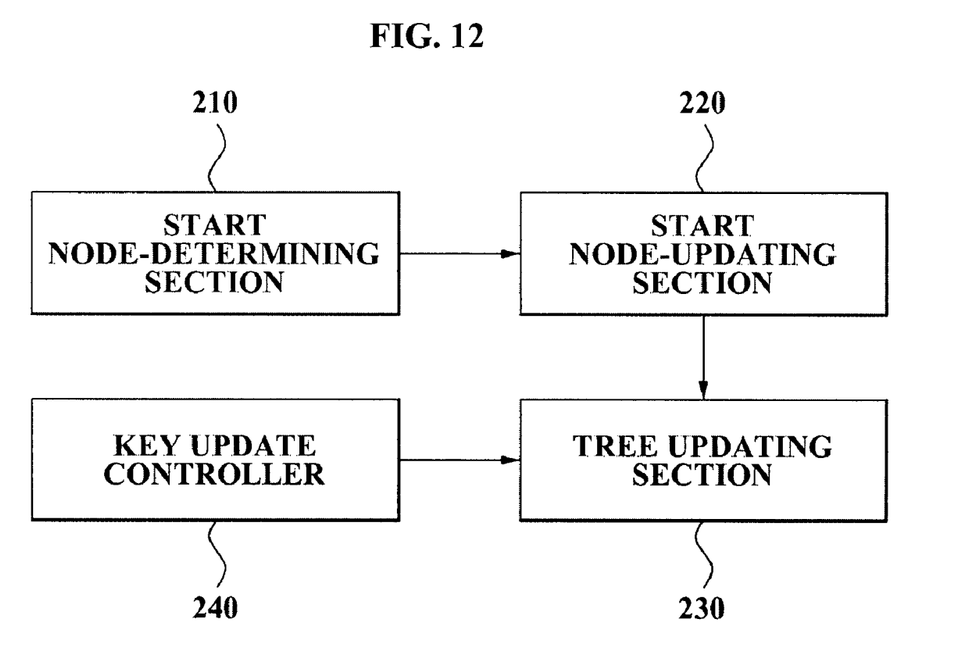
FIG. 12 is a block diagram illustrating the construction of a device for updating a group key according to an exemplary embodiment of the present invention.

FIG. 12 is a block diagram illustrating the construction of a device for updating a group key according to an exemplary embodiment of the present invention. Referring to FIG. 12, the group key-updating device according to an exemplary embodiment of the present invention includes a start node-determining section 210, a start node-updating section 220, a tree-updating section 230 and a key update controller 240. The start node-determining section 210 determines a start node for a key update on a binary tree. The start node-updating section 220 updates a node key of the start node for a key update. The tree-updating section 230 updates a node key of a parent node of a node corresponding to the updated node key using the updated node key.

The key update controller 240 controls the tree-updating section 230 to sequentially perform a key update process for the binary tree so as to update a node key corresponding to the root node of the binary tree. The contents not described in the construction of the device shown in FIG. 12 have been previously described with reference to FIGS. 1 through 11, and hence will be omitted below. The group key-updating method and device of exemplary embodiments of the present invention enables a self-update process to be efficiently performed. Additionally, it is possible to efficiently provide a necessary key to members who cannot perform a self-update process. Moreover, it is possible to effectively select nodes requiring a self-update process and efficiently perform the updating of a key for the selected nodes.

While the present invention has been described with reference to the particular illustrative exemplary embodiments, it is not to be restricted by the exemplary embodiments but only by the appended claims and their equivalent. It is to be appreciated that those skilled in the art can change or modify the exemplary embodiments without departing from the scope and spirit of the present invention.

What is claimed is:

1. A method of updating node keys of a group in a binary tree having a plurality of nodes, each node corresponding to a hardware device or a user, the method comprising:
   determining a start node for a key update on the binary tree, the start node not being a root node of the binary tree;
   updating a node key of the start node; and
   updating a node key of a parent node of the start node using the updated node key of the start node,
   wherein the updating the node key of the parent node comprises setting an output of a one-way function for the updated node key as the node key of the parent node.

2. The method of claim 1, further comprising:
when the parent node has a group member corresponding to a descendent node other than the node corresponding to the updated node key, encrypting a node key of the parent node in an identical method as the descendent node and transmitting the encrypted node key of the parent node to the group member.

3. The method of claim 2, wherein the encrypting a node key of the parent node comprises encrypting the node key of the parent node with a node key of the descendent node.

4. The method of claim 1, wherein the updated node key is an input of the one-way function.

5. The method of claim 1, wherein the determining a start node for a key update comprises:
when a new member joins the group, determining a node corresponding to the new member as the start node for a key update; and
when an existing member leaves the group, determining, as the start node for a key update, a lowermost ancestor node having a descendent node corresponding to a group other than the existing member among ancestor nodes of a node corresponding to the existing member.

6. The method of claim 5, wherein the node corresponding to the new member is one of nodes generated by splitting any one of a leaf node whose node ID is minimum and a leaf node whose node ID is maximum among leaf nodes of the binary tree when the binary tree is a complete binary tree.

7. The method of claim 5, wherein the node corresponding to the new member is one of nodes generated by splitting any one of a leaf node whose node ID is minimum and a leaf node whose depth is maximum among leaf nodes whose depth is the smallest when the binary tree is an incomplete binary tree.

8. The method of claim 5, wherein updating a node key of the start node for a key update comprises:
when the new member joins the group, setting a member key of the new member as the node key of the start node for a key update; and
when the existing member leaves the group, setting, as the node key of the start node for a key update, a node key of a descendent node other than the node corresponding to the existing member, of the ancestor node having the descendent node.

9. The method of claim 5, wherein updating a node key of the start node for a key update comprises:
when the new member joins the group, setting a member key of the new member as the node key of the start node for a key update; and
when the existing member leaves the group, updating the node key of the start node for a key update using a node key of a descendent node other than the node corresponding to the existing member, of the ancestor node having the descendent node.

10. The method of claim 9, wherein updating a node key of the start node for a key update comprises when the existing member leaves the group, setting, as the node key of the start node for a key update, an output of a one-way function for a node key of a descendent node other than the node corresponding to the existing member of the ancestor node having the descendent node.

11. A non-transitory computer-readable recording medium having program instructions stored therein that when executed by a computing device are configured to implement a method of updating node keys of a group in a binary tree having a plurality of nodes, each node corresponding to a hardware device or a user, the method comprising:
determining a start node for a key update on the binary tree, the start node not being a root node of the binary tree;
updating a node key of the start node; and
updating a node key of a parent node of the start node using the updated node key of the start node,
wherein the updating the node key of the parent node comprises setting an output of a one-way function for the updated node key as the node key of the parent node.

* * * * *